United States Patent
Peace

(10) Patent No.: US 11,104,398 B1
(45) Date of Patent: Aug. 31, 2021

(54) MOTORIZED SCOOTER SYSTEM

(71) Applicant: Fred E. Peace, Clearwater, FL (US)

(72) Inventor: Fred E. Peace, Clearwater, FL (US)

( * ) Notice: Subject to any disclaimer, the term of this patent is extended or adjusted under 35 U.S.C. 154(b) by 234 days.

(21) Appl. No.: 16/411,621

(22) Filed: May 14, 2019

Related U.S. Application Data

(60) Provisional application No. 62/715,527, filed on Aug. 7, 2018.

(51) Int. Cl.
| | |
|---|---|
| *B62K 5/007* | (2013.01) |
| *B62K 5/08* | (2006.01) |
| *B62K 15/00* | (2006.01) |
| *B62K 21/22* | (2006.01) |
| *A61H 3/04* | (2006.01) |

(52) U.S. Cl.
CPC ............. *B62K 5/007* (2013.01); *B62K 5/08* (2013.01); *B62K 15/006* (2013.01); *B62K 21/22* (2013.01); *A61H 2003/043* (2013.01); *A61H 2003/046* (2013.01); *B62K 2202/00* (2013.01)

(58) Field of Classification Search
CPC ........ B62K 15/006; B62K 5/007; B62K 5/08; B62K 5/023; B62K 5/025; B62K 19/06; B62K 21/22; B62K 2202/00; A61H 2003/043; A61H 2003/046
USPC ................................ 180/208, 210, 215, 216
See application file for complete search history.

(56) References Cited

U.S. PATENT DOCUMENTS

| | | | | | |
|---|---|---|---|---|---|
| 3,583,727 | A | * | 6/1971 | Wallis | B62D 61/08 280/283 |
| 4,570,739 | A | * | 2/1986 | Kramer | B62D 61/08 180/208 |
| 5,388,659 | A | * | 2/1995 | Pepe | B62K 3/002 180/208 |
| 7,059,441 | B2 | * | 6/2006 | Chen | B62D 21/12 180/208 |
| 8,608,184 | B2 | * | 12/2013 | Janis | A61H 3/04 280/87.03 |
| 2007/0182116 | A1 | * | 8/2007 | Davey | B62K 3/16 280/87.05 |

* cited by examiner

*Primary Examiner* — Kevin Hurley
*Assistant Examiner* — Hosam Shabara
(74) *Attorney, Agent, or Firm* — Lewellyn Law, PLLC; Stephen Lewellyn

(57) ABSTRACT

A frame assembly includes a central shaft with forward and rearward ends and a central extent, a forward sleeve at the forward end, a central sleeve at the central extent, and left and right brackets adjacent to the rearward end. A steering assembly has central, upper, and lower sections. The upper section is received in the central section with left and right handlebars extending laterally. The lower section extends through the forward sleeve. A forward bracket pivotably couples the central and lower sections. A seating assembly has a support post received in the central sleeve and an upper end supporting a seat. A drive assembly has left and right brackets, left and right wheels, a brace extending through the brackets supporting the wheels, a motor positioned adjacent to one of the wheels, and a source of potential.

1 Claim, 3 Drawing Sheets

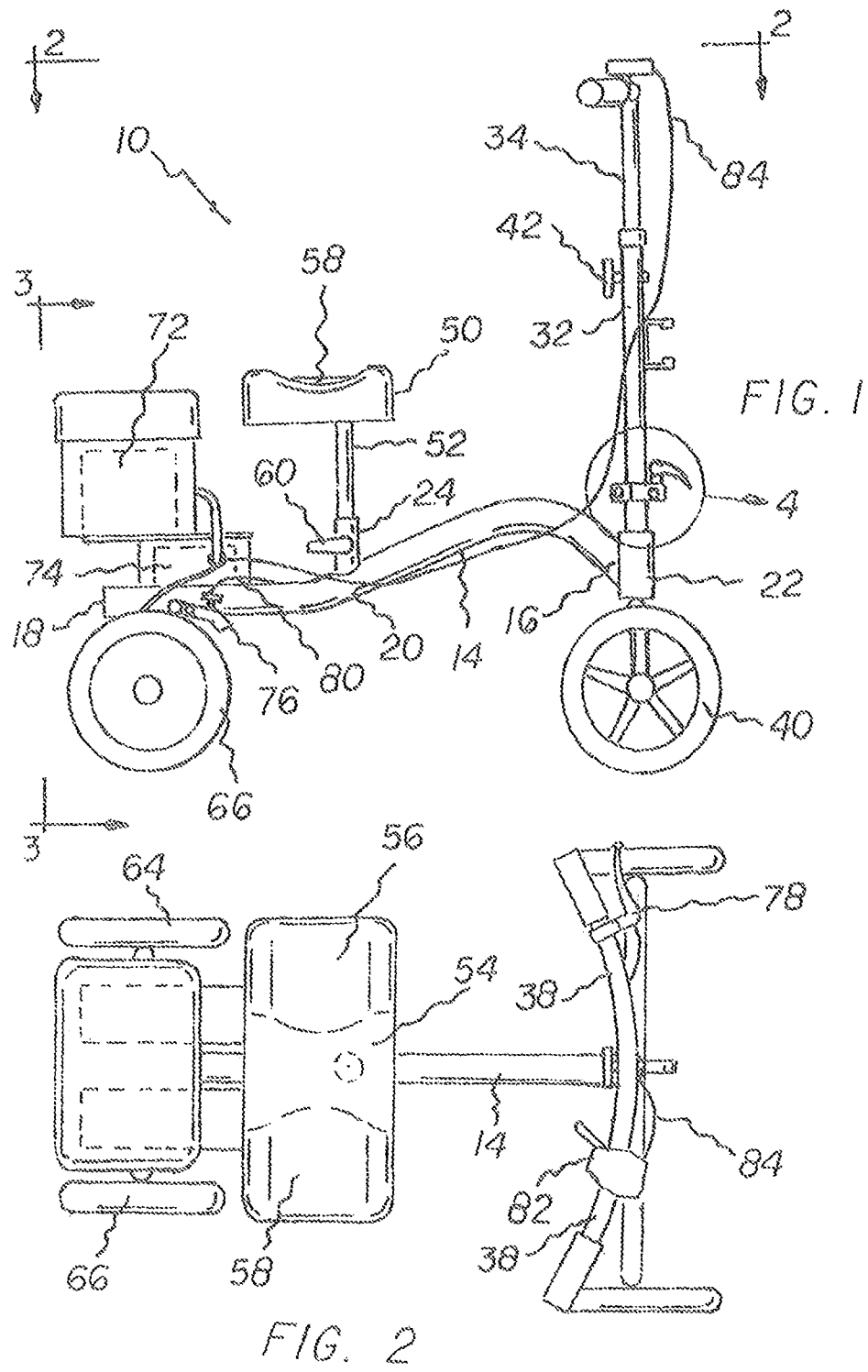

FIG. 3
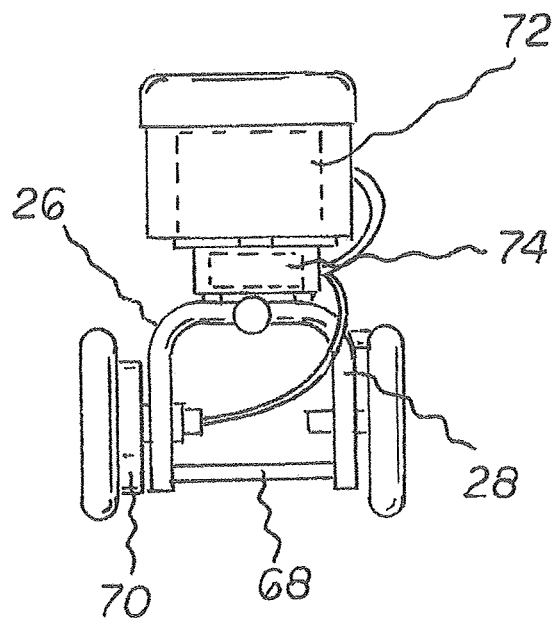
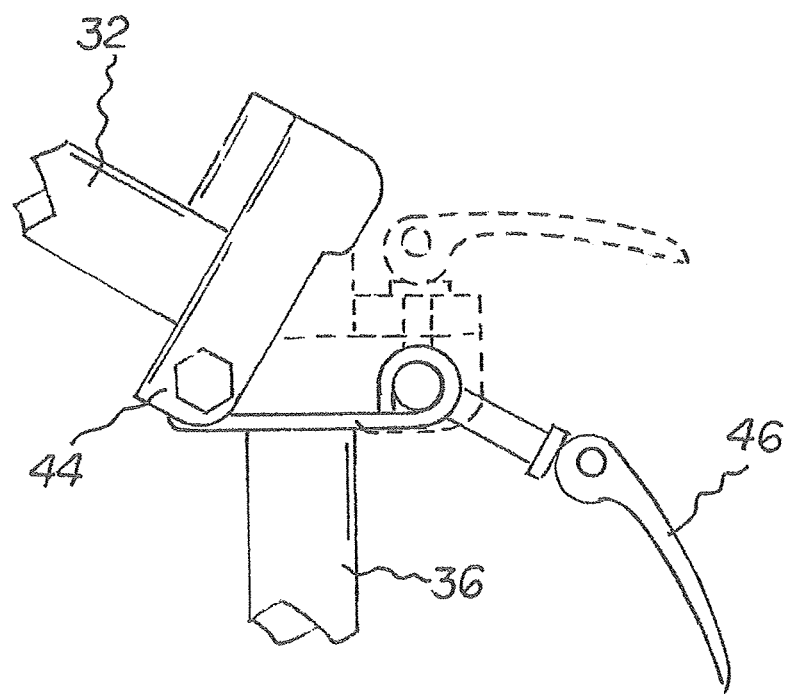
FIG. 4

MOTORIZED SCOOTER SYSTEM

RELATED APPLICATION

This non-provisional application is based upon Provisional Application No. 62/715,527 filed Aug. 7, 2018, the priority of which is claimed and the subject matter of which is incorporated herein by reference.

BACKGROUND OF THE INVENTION

Field of the Invention

The present invention relates to a motorized scooter system and more particularly pertains to transporting people with reduced walking capabilities and for converting between operational and storage orientations. The transporting and the converting being done in a safe, comfortable, convenient, and economical manner.

DESCRIPTION OF THE PRIOR ART

The use of other scooter systems is known in the prior art. More specifically, other scooter systems previously devised and utilized for the purpose of transporting people and converting orientations are known to consist basically of familiar, expected, and obvious structural configurations, notwithstanding the myriad of designs encompassed by the crowded prior art which has been developed for the fulfillment of countless objectives and requirements.

While known devices fulfill their respective, particular objectives and requirements, they do not describe a motorized scooter system that transports people with reduced walking capabilities and converts between operational and storage orientations where the transporting of people and the converting of orientations being done in a safe, comfortable, convenient, and economical manner.

In this respect, the motorized scooter system according to the present invention substantially departs from the conventional concepts and designs of the prior art, and in doing so provides an apparatus primarily developed for the purpose of transporting people with reduced walking capabilities and for converting between operational and storage orientations. The transporting and the converting are done in a safe, comfortable, convenient, and economical manner.

Therefore, it can be appreciated that there exists a continuing need for a new and improved motorized scooter system which can be used for transporting people with reduced walking capabilities and for converting between operational and storage orientations. In this regard, the present invention substantially fulfills this need.

SUMMARY OF THE INVENTION

In view of the disadvantages inherent in the known types of scooter systems of known designs and configurations now present in the prior art, the present invention provides an improved motorized scooter system. As such, the general purpose of the present invention, which will be described subsequently in greater detail, is to provide a new and improved motorized scooter system and method which has all the advantages of the prior art and none of the disadvantages.

To attain this, from a broad perspective, first provided is a frame assembly. The frame assembly includes a central shaft with a forward end, a rearward end, and a central extent between the forward end and the rearward end. The forward end has a forward sleeve and the central extent has a central sleeve. Adjacent to the rearward end are left and right brackets. A steering assembly includes a central, an upper, and a lower section. The upper section is slidably received in the central section. The upper section has mounting brackets to support optional accessories such as a light and a basket and the like. The upper section has left and right handlebars extended laterally. The lower section is extended through the forward sleeve. A forward bracket pivotably couples the central section and the lower section. A seating assembly includes a seat and a support post. The support post is received in the central sleeve and has an upper end to support the seat. A drive assembly includes a left and a right wheel. A brace extends through the left and right brackets. A motor is positioned adjacent to a wheel. The motor has a source of potential.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting. As such, those skilled in the art will appreciate that the conception, upon which this disclosure is based, may readily be utilized as a basis for the designing of other structures, methods and systems for carrying out the several purposes of the present invention.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved motorized scooter system which has all of the advantages of the prior art motorized scooter systems of known designs and configurations of known designs and configurations and none of the disadvantages.

It is another object of the present invention to provide a new and improved motorized scooter system which may be easily and efficiently manufactured and marketed.

It is further object of the present invention to provide a new and improved motorized scooter system which is of durable and reliable constructions.

An even further object of the present invention is to provide a new and improved motorized scooter system which is susceptible of a low cost of manufacture with regard to both materials and labor, and which accordingly is then susceptible of low prices of sale to the consuming public, thereby making such motorized scooter system economically available to the buying public.

Lastly, it is another object of the present invention is to provide a motorized scooter system which can be used for transporting people with reduced walking capabilities and for converting between operational and storage orientations.

The transporting and the converting are done in a safe, comfortable, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of the motorized scooter system constructed in accordance with the principles of the present invention.

FIG. 2 is a plan view taken along line 2-2 of FIG. 1.

FIG. 3 is a rear elevational view taken along line 3-3 of FIG. 1.

FIG. 4 is an enlarged illustration taken at circle 4 of FIG. 1.

The same reference numerals refer to the same parts throughout the various Figures.

DESCRIPTION OF THE PREFERRED EMBODIMENT

Figure 5:
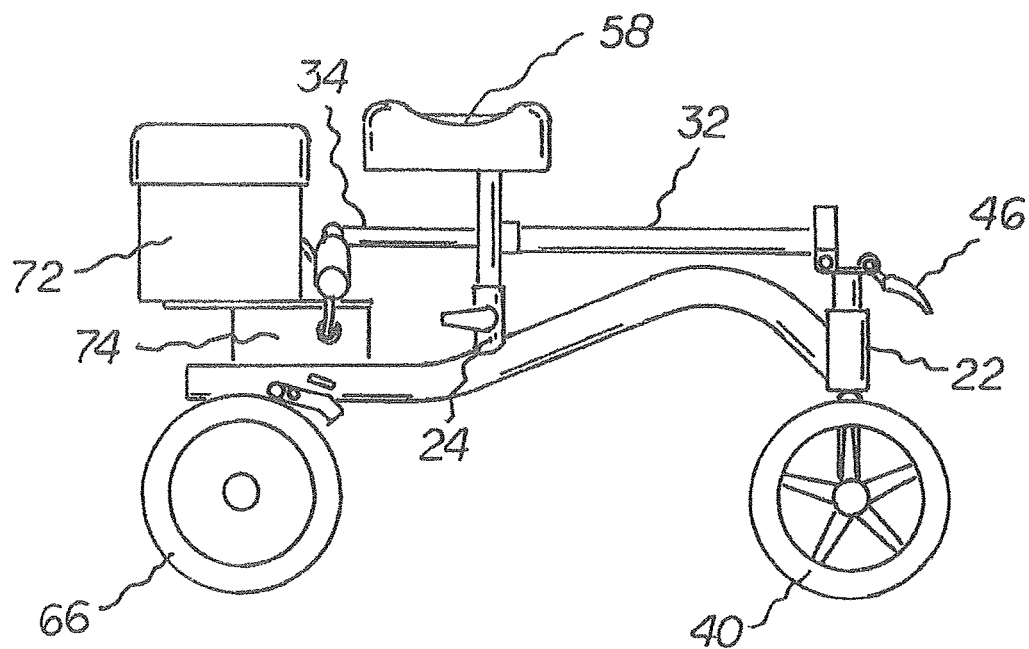
FIG. 5 is side elevational view similar to FIG. 1 but with the system in a storage orientation.
Figure 6:
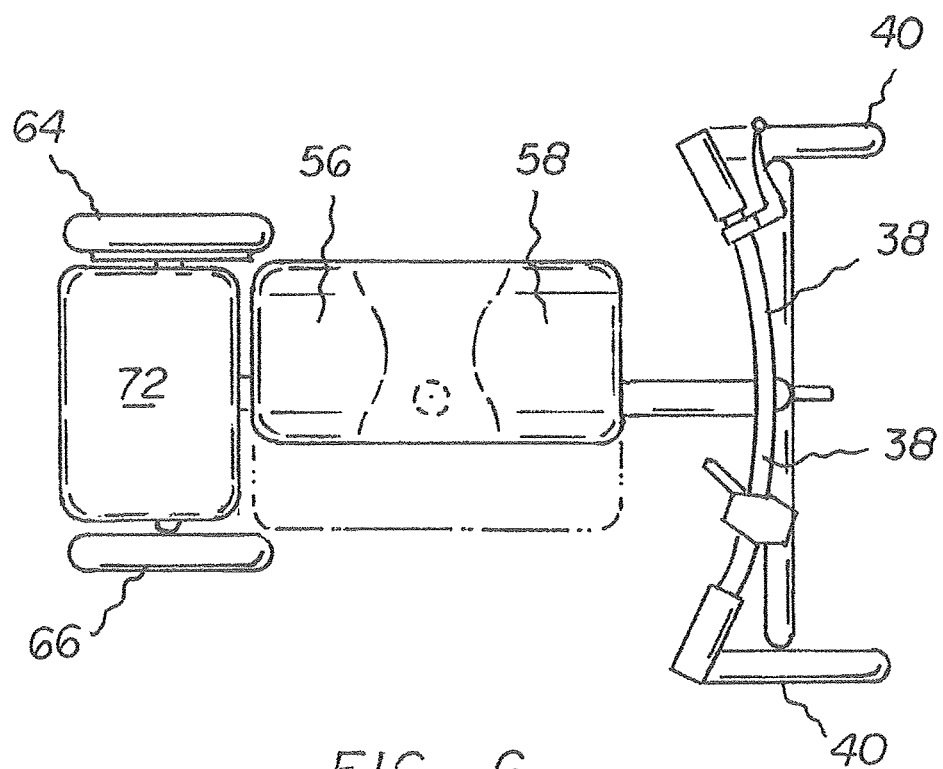
FIG. 6 is a plan view similar to FIG. 2 but with the seat in a kneeling orientation.

With reference now to the drawings, and in particular to FIG. 1 thereof, the preferred embodiment of the new and improved motorized scooter system embodying the principles and concepts of the present invention and generally designated by the reference numeral 10 will be described.

The present invention, the motorized scooter system 10, is comprised of a plurality of components. In their broadest context such include a frame assembly, a steering assembly, seating assembly, and a drive assembly. Such components are individually configured and correlated with respect to each other so as to attain the desired objective.

In the preferred embodiment of the motorized scooter system, designated by reference numeral 10, first provided is a frame assembly. The frame assembly has a central shaft 14. The central shaft is formed of a rigid tube. The central shaft has a forward end 16, a rearward end 18, and a central extent 20 between the forward end and the rearward end. The central shaft rearwardly of the central extent is generally horizontal. The central shaft forward of the central extent is arcuate with a raised center. A forward sleeve 22 with a vertical axis is formed in the forward end. The forward sleeve has a forward passageway extending there through. A central sleeve 24 with a vertical axis is formed at the central extent. The central sleeve has an upwardly facing passageway. A left bracket 26 has an inverted L-shaped configuration. The left bracket extends laterally in a first direction from the central shaft adjacent to the rearward end and then downwardly. A right bracket 28 has an inverted L-shaped configuration. The right bracket extends laterally in a second direction from the central shaft adjacent to the rearward end and then downwardly.

The mounting brackets are adapted to provide support for optional accessories such as a light and a basket and the like. The upper section further has left and right handlebars 38 extending laterally. The lower section is adapted to extend through the forward sleeve. The central section includes wheels 40 and a fastener 42. The fastener secures the upper section at a desired height with respect to the central section. The steering assembly further includes a forward bracket 44. The forward bracket pivotably couples the central section with respect to the lower section. The forward bracket also includes a forward handle 46. The forward handle is adapted to secure the central section in a vertical operative orientation. The forward handle is also adapted to allow the central section to assume a horizontal inoperative orientation for storage.

Provided next is a seating assembly which includes a seat 50 and a support post 52. The support post has a lower end slidably received in the central sleeve. The support post has an upper end fixedly supporting the seat. The seat has a top surface 54 with a left recess 56 and a laterally spaced right recess 58. The left and right recesses each having an axis of rotation perpendicular with the central shaft. A central handle 60 in the central sleeve is for securing the post and the seat in a desired height and rotational orientation.

Lastly provided is a drive assembly which includes a left wheel 64, a right wheel 66, and a brace 68. The brace extends through the left and right brackets. A motor 70 is positioned between the left wheel and the right wheel. A source of direct current potential 72 is located above the rearward end of the frame. An electrical converter 74 is positioned between the source of direct current potential and the motor. A brake 76 is located in operative proximity to the right wheel. A brake control 78 is positioned on the left handle. A left cable 80 couples the brake and the brake control for operator control of a braking action. A drive control 82 is positioned on the right handle. A right cable 84 couples the motor and the drive control for operator control of a driving action.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A motorized scooter system (10) for transporting people with reduced walking capabilities and for converting between operation and storage orientations, the system comprising, in combination:

a frame assembly including a central shaft (14) formed of a rigid tube with a forward end (16) and a rearward end (18) and a central extent (20) there between, the central shaft rearwardly of the central extend being generally horizontal, the central shaft forward of the central extent being arcuate with a raised center, a forward sleeve (22) with a vertical axis formed in the forward end, the forward sleeve having a forward passageway extending there through, a central sleeve (24) with a vertical axis formed at the central extent, the central sleeve having an upwardly facing passageway, a left bracket (26) in an inverted L-shaped configuration extending laterally in a first direction from the central shaft adjacent to the rearward end and then downwardly, a right bracket (28) in an inverted L-shaped configuration extending laterally in a second direction from the central shaft adjacent to the rearward end and then downwardly;

a steering assembly formed of a central section (32) and an upper section (34) and a lower section (36), mount brackets (33) facing forwardly from the central section to provide support for optional accessories, the upper section being slidably received in the central section with left and right handlebars (38) extending laterally, the lower section extending through the forward sleeve, the central section including wheels (49) and a fastener (42) to secure the upper section at a desired height with respect to the central section, the steering assembly including a forward bracket (44) pivotably coupling the central section with respect to the lower section, the forward bracket also including a forward handle (46) adapted to secure the central section in a vertical operative orientation, the forward handle also adapted to allow the central section to assume a horizontal inoperative orientation for storage;

a seating assembly including a seat (50) and a support post (52), the support post having a lower end slidably received in the central sleeve, the support post having an upper end fixedly supporting the seat, the seat having a top surface (54) with a left recess (56) and a laterally spaced right recess (58), the left and right recesses each having an axis of rotation perpendicular with the central shaft, a central handle (60) in the central sleeve to secure the post and the seat in a desired height and rotation orientation; and a drive assembly including a left wheel (64) and a right wheel (66), a brace (68) extending through the left and right brackets, a motor (70) positioned between the left wheel and the right wheel, a source of direct current potential (72) located above the rearward end of the frame, an electrical converter (74) between the source of direct current potential and the motor, a brake (76) located in operative proximity to the right wheel, a brake control (78) positioned on the left handle, a left cable (80) coupling the brake and the brake control for operator control of a braking action, a drive control (82) positioned on the right handle, a right cable (84) coupling the motor and the drive control for operator control of a driving action.

\* \* \* \* \*